United States Patent [19]

Nahm

[11] Patent Number: 5,305,831
[45] Date of Patent: Apr. 26, 1994

[54] BLAST FURNACE SLAG TRANSITION FLUID

[75] Inventor: James J. W. Nahm, Houston, Tex.

[73] Assignee: Shell Oil Company, Houston, Tex.

[21] Appl. No.: 23,181

[22] Filed: Feb. 25, 1993

[51] Int. Cl.$^5$ ............................................. E21B 33/16
[52] U.S. Cl. ................................... 166/293; 166/292; 166/293; 175/65
[58] Field of Search ....................... 166/291, 292, 293; 175/65

[56] References Cited

U.S. PATENT DOCUMENTS

| | | | |
|---|---|---|---|
| 2,075,882 | 4/1937 | Brantly | 166/292 |
| 2,236,987 | 4/1941 | Bechtold | 166/293 |
| 2,336,723 | 12/1943 | Drummond . | |
| 2,649,160 | 8/1953 | Williams et al. . | |
| 2,822,873 | 2/1958 | Harmsen et al. . | |
| 2,899,329 | 8/1959 | Lyons . | |
| 3,077,740 | 2/1963 | Hemwall . | |
| 3,111,006 | 11/1963 | Caron . | |
| 3,499,491 | 3/1970 | Wyant et al. . | |
| 3,557,876 | 1/1971 | Tragesser . | |
| 3,863,718 | 2/1975 | Bruist | 166/291 X |
| 3,887,009 | 6/1975 | Miller et al. . | |
| 3,964,921 | 6/1976 | Persinski et al. . | |
| 4,014,174 | 3/1977 | Mondshine . | |
| 4,450,009 | 5/1984 | Childs et al. . | |
| 4,518,508 | 5/1985 | Conner . | |
| 4,643,617 | 2/1987 | Kanno et al. . | |
| 4,674,574 | 6/1987 | Savoly et al. . | |
| 4,690,589 | 9/1987 | Owa . | |
| 4,692,065 | 9/1987 | Suzuki et al. . | |
| 4,746,245 | 5/1988 | Mork . | |
| 4,761,183 | 8/1988 | Clarke . | |
| 4,897,119 | 1/1990 | Clarke . | |
| 4,924,942 | 5/1990 | Shen | 166/291 |
| 5,020,598 | 6/1991 | Cowan et al. . | |
| 5,058,679 | 10/1991 | Hale et al. . | |
| 5,082,499 | 1/1992 | Shen . | |
| 5,101,902 | 4/1992 | Parcevaux et al. . | |
| 5,106,423 | 4/1992 | Clarke . | |
| 5,106,711 | 5/1992 | Cowan.. | |
| 5,133,806 | 7/1992 | Sakamoto et al. . | |
| 5,147,565 | 9/1992 | Bour et al. . | |
| 5,199,489 | 4/1993 | Johnson et al. | 166/291 X |

FOREIGN PATENT DOCUMENTS

| | | |
|---|---|---|
| 61-48454 | 3/1986 | Japan . |
| 833704 | 6/1981 | U.S.S.R. . |
| 2216574A | 2/1981 | United Kingdom . |
| 2223255A | 3/1983 | United Kingdom . |

*Primary Examiner*—George A. Suchfield

[57] ABSTRACT

In a drilling and cementing operation utilizing a lead cementitious slurry made from blast furnace slag an drilling fluid, a lower density transition fluid is utilized between said lead cementitious slurry and a tail Portland cement slurry. In one embodiment, the lead cementitious slurry and the transition fluid slurry are made by introducing blast furnace slag into a flowing stream of drilling fluid.

20 Claims, 1 Drawing Sheet

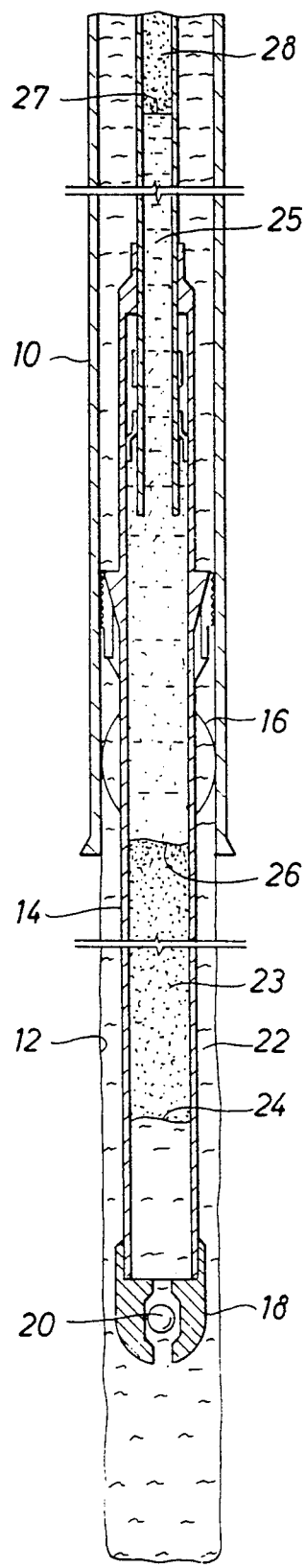
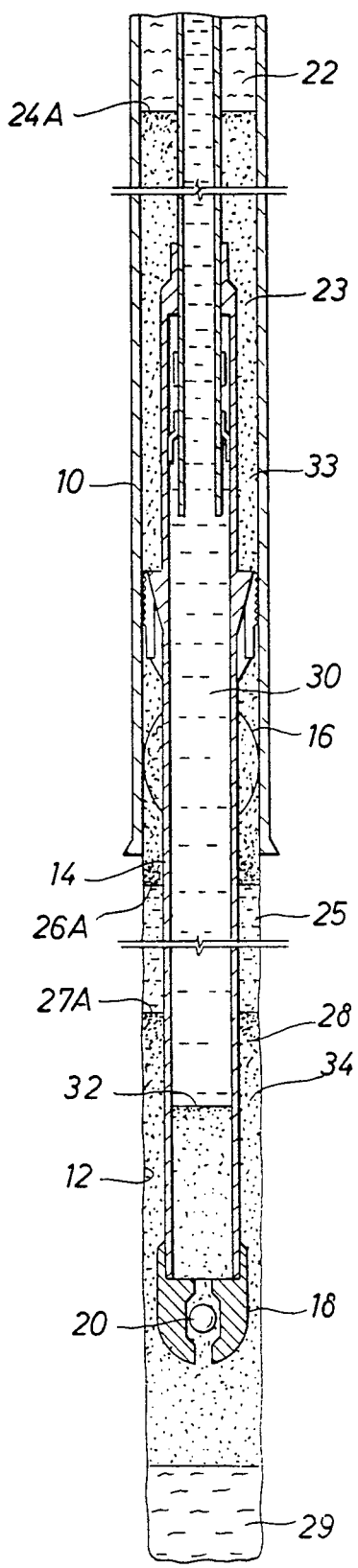
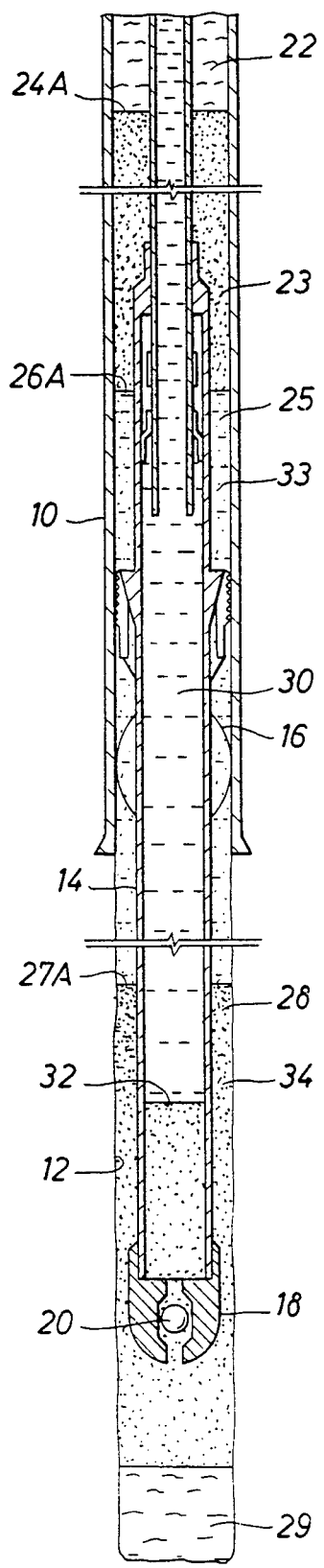

BLAST FURNACE SLAG TRANSITION FLUID

BACKGROUND OF THE INVENTION

This invention relates to drilling and cementing boreholes.

The drilling of boreholes is generally carried out using a rotary drilling process. The rotary drilling of a borehole is accomplished by rotating a drill string having a drill pipe and a drill bit at its lower end. Weight is applied to the drill bit while rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid down through the drill string and up to the surface between the drill string and the wall of the borehole.

Once the borehole has been drilled to the desired depth, it may be desirable to isolate the separate areas, zones or formations transversed by the borehole. For extraction of fluids from formations, and for protection against borehole collapse, one or more conduits (casings) must be inserted into the borehole extending from the surface downward. Thereafter, liners may be hung inside the casings. A liner is any string of casing having its top below the surface of the ground. Liners are used in deep wells to case off an open hole section and thus eliminate a full string of casing.

At this point it becomes necessary to fill the annulus between the casing and the borehole wall or between the liner and casing with a material which will seal the annulus to inhibit communication between various formations penetrated by the wellbore and which will provide structural support for the casing or liner. This is commonly referred to as primary cementing.

Generally, the borehole, into which the casing or liner to be cemented is installed, is filled with drilling mud. Therein lie several problems. Conventional Portland cement and conventional drilling muds are incompatible. Thus, as the cement is forced down the casing or liner and up into the annulus it is commingled with the drilling mud at any interface between the mud and the cement. The resulting mixture generally thickens or becomes a gel and does not set up into a strong cement. In addition the gel strength and viscosity become uncontrollable and the mixture may become too viscous to pump. Alternatively, the mixture may get thinner and cause solids to settle down in the annulus where they may bridge and restrict passage of the cement slurry. In either event, the situation is unsatisfactory. Furthermore, the used drilling fluid must be disposed of which adds an additional procedure to the drilling operation. Also, in the case of oil base muds there are increased environmental concerns with drilling fluid disposal.

Hale et al, U.S. Pat. No. 5,058,679 (Oct. 22, 1991) broadly disclose mixing blast furnace slag with drilling mud to produce a cement, thus avoiding the necessity for disposing of the drilling fluid. As the patent discloses, the drilling fluid is compatible with the blast furnace slag and good cement results. However, drilling fluid ingredients in the resulting cementitious slurry can still interfere with Portland cement if a Portland cement tail is desired following a blast furnace slag lead. Cowan, U.S. Pat. No. 5,016,711 (May 21, 1991) broadly discloses improved cement adhesion through the use of a surfactant. Parceveaux et al., U.S. Pat. No. 5,101,902 (Apr. 7, 1992) broadly describes spacers between mud and cement.

SUMMARY OF THE INVENTION

It is an object of this invention to cement a casing or liner with a blast furnace slag lead cement followed by a Portland cement tail.

It is a further object of this invention to achieve an especially good seal at each end of a casing or liner being cemented.

It is a further object of this invention to eliminate unset fluid columns which may result in casing damage due to uneven strength in the annulus.

In accordance with this invention, a wellbore cementing operation is carried out by a process comprising sequentially introducing a lead cementitious slurry comprising blast furnace slag and a drilling fluid, a more dilute blast furnace slag cementitious transition fluid, and a Portland cement cementitious slurry tail.

BRIEF DESCRIPTION OF THE DRAWINGS

In the drawings, forming a part hereof, wherein like reference characters denote like parts in the various views, FIG. 1 is a cross sectional representation of a borehole at an initial stage in the process.

FIG. 2 is a cross sectional view of the borehole at a later stage in the process wherein the liner is cemented.

FIG. 3 is a cross-sectional view of a borehole showing the result of miscalculating the amount of final fluids to be introduced or inaccurate estimation of hole volumes.

DETAILED DESCRIPTION OF THE INVENTION

In general, when a Portland cement slurry is contacted with a mud containing a cellulosic polymer, certain adverse physical interactions take place as described hereinabove.

It has been discovered that by utilizing a transition fluid between a blast furnace slag/drilling fluid lead cementitious slurry and a Portland cement tail cementitious slurry, the unacceptable viscosity increase that can occur on Portland cement being intermingled with a blast furnace slag cementitious slurry made, for instance, from drilling fluid containing cellulose polymers such as starch, CMC (carboxymethyl cellulose) and HEC (hydroxyethyl cellulose) can be avoided.

Definitions

By 'direct fluid contact' between the displacement fluid and the Portland cement slurry is meant that the displacement fluid directly contacts the upper surface of the column of Portland cement slurry as opposed to having a solid wiper plug disposed between the Portland cement slurry and the displacement fluid. By 'direct fluid contact' between the blast furnace slag/drilling fluid cementitious slurry and the drilling fluid or mud is meant that the blast furnace slag/drilling fluid cementitious slurry directly contacts the upper surface of the column of drilling fluid or mud as opposed to having a wiper plug with a rupturable diaphragm disposed between the blast furnace slag/drilling fluid cementitious slurry and the drilling fluid or mud.

The term 'pipe' means either a casing or a liner.

The term 'primary cementing' refers to any cementing operation wherein a cementitious slurry is passed into an annulus surrounding a pipe and thus encompasses both the cementing of casings wherein the annulus is between the casing and the borehole wall and the cementing of liners where the annulus includes an annulus between the liner and the casing.

By 'activator system' is meant either a single activator or a mixture of activators for setting of blast furnace slag.

As used herein 'down' or 'bottom' as it relates to a drill string or casing, means in a direction toward the farthest reach of the borehole even though in rare instances the borehole can be disposed in a horizontal position. Similarly, 'up' or 'top' means back toward the beginning of the borehole.

Process Detail

Referring now to FIG. 1, there is shown an initial stage in a cementing operation wherein a wellbore has been drilled in a subterranean formation, the drill string removed and a liner is hung in an existing casing. A casing 10 is shown in an upper portion of the wellbore and a further extension of the wellbore as defined by wellbore walls 12 is depicted. Disposed within the wellbore is a liner 14 to be cemented in place. A centralizer 16 centers the liner pipe. A casing joint equipped with a float shoe 18 having a valve 20 is affixed to a lower portion of the liner. The borehole from the bottom thereof to a point above the top of the liner, generally all the way to the surface is filled with drilling fluid or mud from the drilling operation, the drilling fluid or mud being depicted by reference character 22. A blast furnace slag/drilling fluid lead slurry 23 is disposed above the drilling fluid in direct fluid contact therewith at interface 24, followed by a more dilute blast furnace slag transition fluid slurry 25. The interface of the more dilute blast furnace slag transition fluid slurry 25 and the blast furnace slag/drilling fluid slurry 23 is shown by reference character 26. Some mixing occurs at interface 24 and at interface 26 as well as at interface 27 between the Portland cement slurry 28 and the more dilute blast furnace slag transition slurry 25. Most of this mixing, however, occurs at corresponding interfaces 24A, 26A, and 27A as depicted in FIG. 2, since flow through the annuli is more subject to mixing forces.

FIG. 2 shows a later stage in the cementitious slurry displacement in accordance with the invention. Drilling fluid 22 has been displaced out of the liner and out of the annulus between the liner and the borehole (and between the liner and the casing), with some remaining in rat hole 29. The cementitious slurries are now displaced into the annulus surrounding the liner by displacement fluid 30. As can be seen, displacement fluid 30 is in direct fluid contact with the Portland cement slurry at interface 32. As can be further seen from FIG. 2, the displacement is stopped with the tail Portland cement slurry 28 sealing the liner at the bottom thereof and the more concentrated blast furnace slag/drilling fluid cementitious slurry 23 sealing the annulus at the top of the casing. These are the most important areas in a cement job. In the middle providing a compatible transition from the blast furnace slag/drilling fluid cementitious slurry to the Portland cement slurry is the transition fluid 25 which itself is a cementitious slurry and thus sets up to support the casing.

It is to be noted that in conventional cementing operations a volume of spacer fluid (to prevent commingling of drilling fluid and cementitious slurry) will generally be used such that the annular column of spacer fluid would be 500 to 1,000 feet in length. In accordance with this invention no spacer fluid is required and only a small amount, generally 5–300, preferably 10–100, more preferably 10–60 linear feet of transition fluid is utilized. This is because the transition fluid is compatible with both the Portland cement slurry and the blast furnace slag/drilling fluid cementitious slurry and is itself a settable composition. Hence, only a small amount is needed to prevent commingling of the Portland cement with the blast furnace slag/drilling fluid cementitious slurry. Thus, at each interface a compatible situation exists. At interfaces 24 and 24A there is no adverse reaction because blast furnace slag (a constituent of cementitious slurry 23) is fully compatible with drilling fluid. At interfaces 26 and 26A there are no adverse reactions because the two components are both blast furnace slag-containing slurries. At interfaces 27 and 27A there are no adverse reactions because Portland cement is compatible with the diluted blast furnace slag transition fluid. The reason for the incompatibility without the transition fluid 25 is that the Portland cement is incompatible with drilling fluid per se, for instance, which contains high concentrations of cellulose polymers such as starch, CMC and HEC and with cementitious slurries having a high concentration of such polymer-containing drilling fluids.

On a related matter concerning compatibility, it is noted that any admixture of blast furnace slag/drilling fluid cementitious slurry 23 and drilling fluid 22 does not give the contamination of the drilling fluid that a corresponding admixture with Portland cement would. This is because Portland cement, upon hydration, produces calcium hydroxide which is a major source of mud contamination. Also, because the blast furnace slag is a latent hydraulic material which will eventually set after contact with water, any blast furnace slag/drilling fluid cementitious slurry admixed with the drilling fluid 22 will form a solid which can be removed by shale shakers in the normal manner in which cuttings are removed. Those particles that may be too small to be removed by the shale shakers will be incorporated into the drilling mud as are normal drill solids.

FIG. 3 shows the effect of miscalculating the amount of transition fluid needed or inaccurate estimation of hole volumes. Here the transition fluid 25 is displaced to the general area of the liner top which is an important area to be sealed. If this were a mere spacer, it would never set and thus the cement job would be weak right in one of the more critical areas. But since the transition fluid contains a cementitious component, it will set and give a seal that is adequate even though it is short of the optimal situation being sought which is depicted in FIG. 2 where the high density blast furnace slag slurry is securing the top of liner 14.

While this has been described in connection with the cementing of a liner wherein the cementitious slurry is forced into the annular space 33 between the liner pipe 14 and the casing 10 or the annular space 34 between the liner and borehole 12, it is equally applicable to cementing a casing where the cementitious slurry is forced up into an annulus between a regular casing and the borehole wall.

Drilling Fluid

The term 'drilling fluid' as used herein includes water or oil based drilling fluids which contain water. These fluids contain at least one or more additives such as viscosifiers, thinners, dissolved salts, solids from the drilled formations, solid weighting agents to increase the fluid density, formation stabilizers to inhibit deleterious interaction between the drilling fluid and geologic formations, or additives to improve the lubricity of the drilling fluid. The drilling fluid, optionally, can contain a small amount of blast furnace slag. Generally, in such instances the drilling fluid will contain from about 1 to about 100 lbs/bbl, preferably 10 to 80 lbs/bbl, most preferably 40 to 60 lbs/bbl based on the barrels of final drilling fluid. This option is beneficial in that it allows laying down a settable blast furnace slag filter cake. If blast furnace slag is present in the drilling fluid then the drilling fluid should also contain a retarder for the blast furnace slag. Retarders such as the polyalcohols described in said Hale et al patent, U.S. Pat. No. 5,058,679, can be used and the disclosure of which is hereby incorporated by reference. Other suitable retarders include organic compounds in general and more specifically, low molecular weight organic acids. Chrome and chrome-free lignosulfonates are also retarders as well as dispersants.

The term 'water-based drilling fluid' is intended to encompass both fresh water muds, salt water-containing muds, whether made from seawater or brine, and other muds having water as the continuous phase including oil-in-water emulsions, as well as essentially oil-free water based muds.

The term 'oil-based drilling fluids' is meant to cover muds having oil as the continuous phase, including low water content oil-base mud and invert oil emulsion mud.

It is sometimes desired that the water-based drilling fluids use water containing dissolved salts, particularly sodium chloride. In these instances, 0.1 to 26 wt %, preferably 3 to 10 wt % sodium chloride may be used. One suitable source is to use seawater or a brine solution simulating seawater. The strength of the resulting blast furnace slag/drilling fluid cement is actually enhanced which is contrary to what would be expected in view of the intolerance of Portland cement to brine. Various salts, including organic salts, are suitable for use in the drilling fluid used in this invention in addition to, or instead of NaCl, including, but not limited to, NaBr, KCl, $CaCl_2$, $NaNO_3$, $NaC_2H_3O_2$, $KC_2H_3O_2$, $NaCHO_2$ and $KCHO_2$. Sodium chloride is usually preferred, as noted above. These salts can be used, if desired, from 0.1 wt % up to the saturation point under the conditions employed.

The invention is applicable to oil or water based drilling fluids. However, the invention is of primary value with water based fluids, preferably essentially oil-free aqueous drilling fluids.

Blast Furnace Slag/Drilling Fluid Lead Slurry

The first cementitious slurry utilized in this invention is made by combining blast furnace slag and drilling fluid. The preparation of cementitious slurries in such a manner is broadly disclosed in Hale et al, U.S. Pat. No. 5,058,679 (Oct. 22, 1991), the disclosure of which is incorporated herein by reference.

Such cementitious slurries can be prepared in any suitable manner. Fresh drilling fluid can simply be admixed with blast furnace slag. Generally, however, used drilling fluid will be combined with blast furnace slag thus providing a cementitious slurry and avoiding the necessity for disposing of used drilling fluid. The blast furnace slag can be incorporated in the drilling fluid in any suitable manner. The drilling fluid can be isolated and admixed with blast furnace slag in a batch process. Preferably, however, blast furnace slag is added to a flowing stream of the drilling fluid. In some instances, it may be desired to dilute the drilling fluid, for instance by adding diluent to a flowing stream of the drilling fluid and then add the blast furnace slag (or additional blast furnace if blast furnace slag is present in the drilling fluid). The blast furnace slag can be added at a downstream location of the flowing stream from the diluent or can be added in a subsequent mixing zone.

The dilution, if any, and addition of the blast furnace slag are controlled so as to give a final cementitious slurry density within the range of about 9–20 lbs/gal, preferably 13.5–18 lbs/gal, most preferably 13.5–16 lbs/gal. The amount of blast furnace slag will generally be in the range of from about 20 lbs/bbl to about 600 lbs/bbl, preferably 100 lbs/bbl to 500 lbs/bbl, most preferably 150 lbs/bbl to 350 lbs/bbl. This is the total amount including the residual blast furnace slag, if any, from the drilling fluid.

Blast Furnace Slag Transition Fluid Slurry

The second cementitious slurry utilized in the sequence of this invention is a lower density blast furnace slag-containing slurry. Preferably, this transition slurry is made by simply adding a smaller amount of blast furnace slag to the same used drilling fluid utilized in preparing the lead cementitious slurry. This preference, however, is primarily based on convenience in the preparation. It is within the scope of the invention to prepare the lower density transition slurry in any suitable manner. For instance, blast furnace, water, and other desired ingredients can simply be combined. Alternatively, an aliquot of the blast furnace slag cementitious slurry of the lead cement could simply be diluted with water. As with the lead slurry, this transition slurry can be made in a batch process or by adding the slag to used drilling fluid "on the fly", i.e., adding the blast furnace slag to a flowing stream of the drilling fluid. The final density can range from 8.5–16, generally 8.5 to less than 13.5, more generally 8.5 to 13. The amount of blast furnace slag in the transition fluid is generally within the range of 20 to 250 lbs/bbl of transition fluid, preferably 25 to 200 lbs/bbl, more preferably 40 to 100 lbs/bbl, but in any event generally less than that in the lead slurry.

As noted above, Portland cement forms adverse reactions with the additives in drilling fluids, particularly the polymeric materials such as CMC, HEC and/or starch. The transition fluid has a lower density in most cases by virtue of having less blast furnace slag. Thus, the proportion of drilling fluid additives is generally greater, not lesser in the transition fluid. Remarkably, however, the transition fluid is more compatible with the Portland cement as the data of the Examples show. While not wishing to be bound by theory, it is believed that at the lower density there is a lesser amount of slag or lower total surface area of slag for the adverse physical reactions to take place and hence the greater effective compatibility.

Blast Furnace Slag Detail

By 'blast furnace slag' is meant the hydraulic refuse from the melting of metals or reduction of ores in a blast furnace. Such material is disclosed in the Hale et al patent, U.S. Pat. No. 5,058,679 (Oct. 22, 1991), referred to hereinabove.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily dried and ground to the desired degree of fineness. Silicon dioxides, aluminum oxides, iron oxides, calcium oxide, magnesium oxide, sodium oxide, potassium oxide, and sulphur are some of the chemical components in slags. Generally, the blast furnace slag used in this invention has a particle size such that it exhibits a Blaine specific surface area between 2,000 $cm^2/g$ and 15,000 $cm^2/g$, preferably between 3,000 $cm^2/g$ and 15,000 $cm^2/g$, more preferably between 4,000 $cm^2/g$ and 9,000 $cm^2/g$, most preferably between 4,000 $cm^2/g$ and 8,500 $cm^2/g$. An available blast furnace slag which fulfills these requirements is marketed under the trade name "NEWCEM" by the Blue Circle Cement Company. This slag is obtained from the Bethlehem Steel Corporation blast furnace at Sparrows Point, Maryland.

A usual blast furnace slag composition range in weight percent is: $SiO_2$, 30-40; $Al_2O_3$, 8-18; CaO, 35-50; MgO, 0-15; iron oxides, 0-1; S, 0-2 and manganese oxides, 0-2. A typical specific example is: $SiO_2$, 36.4; $Al_2O_3$, 16.0; CaO, 43.3; MgO, 3.5; iron oxides, 0.3; S, 0.5; and manganese oxides, <0.1.

The blast furnace slag utilized in preparing the lead slurry and the transition slurry can be the same or different but will be of the type described hereinabove.

Blast furnace slag having relatively small particle size is frequently desirable when used to form the cementitious slurries because of the greater strength it imparts in many instances to a final cement. Thus, a transition fluid containing blast furnace slag with a particle size such that it exhibits a Blaine specific surface area within the range of 2,000 to 8,000 $cm^2/g$, generally 4,000 to 7,000 $cm^2/g$ can be used economically, followed by a blast furnace slag cementitious slurry utilizing blast furnace slag having a particle size such that it exhibits a Blaine specific surface area within the range of greater than 7,000 $cm^2/g$ to 25,000 $cm^2/g$, generally 8,000 to 15,000 $cm^2/g$, which produces higher set strengths but which is more expensive. The same blast furnace slag can, however, be used in both the transition fluid and the blast furnace slag cementitious slurry.

Characterized in terms of particle size the term "fine" can be used to describe particles with a Blaine specific surface area in the range of 4,000 to 7,000 $cm^2/g$, corresponding to 16 to 31 microns in size; "microfine" can be used to describe those particles with a Blaine specific surface area from greater than 7,000 $cm^2/g$ to 10,000 $cm^2/g$ that correspond to particles of 5.5-16 microns in size and "ultrafine" can be used to describe particles with a Blaine specific surface area over 10,000 $cm^2/g$ that correspond to particles 5.5 microns and smaller in size. Small particle size blast furnace slags are available from Blue Circle Cement Co., Koch Minerals, Wichita, Kansas, under the trade name "WELL-CEM", and from Geochem under the trade name "MICROFINE MC100".

However, it is very time consuming to grind blast furnace slag to these particles sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of preparing the cementitious slurry using blast furnace slag, a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4 wt % of the slag, would need to be ground to the ultrafine particle size. Generally, 5 to 25 wt %, more preferably 5 to 10 wt % can be ground to the ultrafine particle size and the remainder ground in a normal way thus giving particles generally in a size range of greater than 11 microns, the majority being in the 11 to 31 micron range. Both the lead slurry and the transition slurry are cementitious materials containing blast furnace slag and thus will have an activator system to speed up the setting.

Suitable activators include lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, titanium carbonate, potassium carbonate, sodium hydroxide, potassium hydroxide, potassium sulfate, potassium nitrite, potassium nitrate, calcium hydroxide, sodium sulfate, copper sulfate, calcium oxide, calcium sulfate or gypsum, calcium nitrate, calcium nitrite, and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to 'lbs/bbl' means pounds per barrel In some instances, it may be desirable to use a material for a particular effect along with the activator even though it may also act as a retarder. For instance, a chromium lignosulfonate may be used as a thinner in the cementitious slurry along with the activator even though it also functions as a retarder.

Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, phenol sulfonate, dodecylbenzene sulfonate, and mixtures thereof.

Portland Cement Tail Cementitious Slurry

Any conventional Portland cement can be utilized for the tail cementitious slurry of this invention. Preferably, the Portland cement is an API cement such as class A, C, G and H formulated to meet cementing conditions.

Preferably, the Portland cementitious slurry has a density of at least 14 lbs/gal, more preferably 14.5–18 lbs/gal, most preferably 15–17 lbs/gal.

Surfactants

Surfactants may be present in the cementitious slurries, particularly the lead or transition cementitious slurry when an oil based mud is being displaced. If used at all, the surfactants are preferably materials which are capable of producing oriented layers or micelles. Broadly, about 0.05 to about 5.0 lbs/bbl, preferably 0.1 to 15 lbs/bbl, most preferably 1 to 10 lbs/bbl can be used but this can vary depending on the particular surfactant and the composition of the total cementitious slurry. These values for active ingredients are based on the total volume of final cementitious slurry. The surfactant can be either ionic, nonionic, or amphoteric, preferably nonionic or anionic, most preferably anionic, although all surfactants broadly are intended to be included.

EXAMPLES

Example 1

An oil well was drilled using a mud having the approximate formulation: 20 wt % sodium chloride brine, 10 lbs/bbl bentonite, 6 lbs/bbl carboxymethyl starch (fluid loss preventor) sold under the trade name "BIOLOSE" by Milpark Drilling Fluids, 1 lb/bbl partially hydrolyzed polyacrylamide (PHPA) which is a shale stabilizer, sold under the trade name "NEWDRIL" by Milpark Drilling Fluids, 1.25 lbs/bbl CMC sold under the trade name "MILPAC" by Milpark Drilling Fluids, 70 lbs/bbl low gravity drill solids and 250 lbs/bbl barite.

The well was successfully cemented utilizing a lead cementitious slurry prepared by adding 300 lbs/bbl of blast furnace slag having a particle size such that it exhibits a Blaine specific surface area of about 5,500 cm$^2$/g to the drilling fluid. Also added to the drilling fluid was 4 lbs/bbl of sodium hydroxide and 14 lbs/bbl of sodium carbonate. The resulting lead cementitious slurry had a density of 15.3 lbs/gal. A transition fluid made by adding 150 lbs/bbl of the same blast furnace slag to the same used drilling fluid to give a final density of 13 lb/gal was utilized. The transition fluid was followed by a tail Portland cement cementitious slurry made using a class H Portland cement to give a cement density of 16.4 lbs/bbl. The volume of transition fluid was 10 barrels which would give approximately 160 linear feet of transition fluid in the annulus surrounding the casing being cemented. There was no problem of mixing and pumping any of the slurries and the well successfully passed a top of liner pressure test.

Example 2

This Example simulates the serious problems that could arise from a cementing operation without the transition fluid.

TABLE I

Compatibility of a 16.4 lb/gal Class H Cement with Settable Transition Fluids
FANN VISCOSITY DATA AT ROOM TEMPERATURE

| Run | Composition | Fan Viscometer Dial Reading | | | | | | 10 Sec. Gel Strength lb/100 ft$^2$ | 10 Min. Gel Strength lb/100 ft$^2$ | Plastic Viscosity lb/100 ft$^2$ | Yield Point lb/100 ft$^2$ | T.T.$^9$ @ 170° F. |
|---|---|---|---|---|---|---|---|---|---|---|---|---|
| | | 600 | 300 | 200 | 100 | 6 | 3 | | | | | |
| 1 | 16.4 lb/gal Class H Tail Cement | 300+$^1$ | 224 | 161 | 92 | 11 | 8 | 11 | 32 | TTM$^1$ | TTM$^1$ | 3:07 |
| 2 | 15.3 lb/gal Lead Slag Cement | 132 | 74 | 54 | 31 | 6 | 5 | 7 | 27 | 58 | 16 | 5:00 |
| 3 | 75% Class H/25% 15.3 lb/gal Lead | | | | | Too Thick to Measure | | | | | | |
| 4 | 50% Class H/50% 15.3 lb/gal Lead | 261 | 185 | 126 | 92 | 94 | 95 | 91 | — | 76 | 109 | |
| 5 | 25% Class H/75% 15.3 lb/gal Lead | 209 | 126 | 93 | 55 | 9 | 7 | 11 | 29 | 83 | 43 | |
| 6 | 13 lb/gal Transition Fluid A | 52 | 29 | 20 | 12 | 3 | 2 | 3 | 3 | 23 | 7 | 5:15 |
| 7 | 75% Class H/25% Transition Fluid A | 215 | 141 | 115 | 83 | 65 | 65 | 65 | — | 74 | 67 | |
| 8 | 50% Class H/50% Transition Fluid A | 106 | 82 | 63 | 38 | 7 | 6 | 9 | — | 24 | 58 | |
| 9 | 25% Class H/75% Transition Fluid A | 89 | 58 | 39 | 23 | 5 | 4 | 7 | — | 36 | 17 | |
| 10 | 12.6 lb/gal Transition Fluid B | 51 | 29 | 20 | 12 | 3 | 2 | — | — | 22 | 7 | |
| 11 | 75% Class H/25% Transition Fluid B | 167 | 109 | 91 | 62 | 55 | 61 | — | — | 58 | 51 | |
| 12 | 75% Class H w/o FLA$^{10}$/25% Transition Fluid B | 143 | 121 | 111 | 104 | 71 | 39 | — | — | 22 | 99 | |
| 13 | 12 lb/gal Transition Fluid C | | | | | | | | | | | |
| 14 | 75% Class H/25% Transition Fluid C | 165 | 105 | 80 | 50 | 9 | 7 | — | — | 60 | 45 | 3:00+ |
| 15 | 12 lb/gal Transition Fluid D | | | | | | | | | | | |

TABLE I-continued

Compatibility of a 16.4 lb/gal Class H Cement with Settable Transition Fluids
FANN VISCOSITY DATA AT ROOM TEMPERATURE

| Run | Composition | Fan Viscometer Dial Reading | | | | | | 10 Sec. Gel Strength lb/100 ft$^2$ | 10 Min. Gel Strength lb/100 ft$^2$ | Plastic Viscosity lb/100 ft$^2$ | Yield Point lb/100 ft$^2$ | T.T.$^9$ @ 170° F. |
|---|---|---|---|---|---|---|---|---|---|---|---|---|
|   |   | 600 | 300 | 200 | 100 | 6 | 3 |   |   |   |   |   |
| 16 | 75% Class H/25% Transition Fluid D | 43 | 22 | 16 | 9 | 4 | 4 | — | — | 21 | 1 |   |

$^1$Too thick to measure
Notes:
Tail Cement: Ideal Class H + 4.33 gal/sk$^1$ water + 0.02 gal/sk "D144$^2$" + 0.37 gal/sk "B12.1$^3$" + 0.06 gal/sk "D81$^4$"
Lead Slag-Mix Slurry: 0.72 bbl 12.2 lb/gal Mud$^5$ + 4 lbs "SPERSENE CF$^6$" + 4 lbs NaOH + 14 lbs Na$_2$CO$_3$ + 250 lbs "NEWCEM$^7$"
Transition Fluid A: 0.92 bbl 12.2 lb/gal Mud$^5$ + 2 lbs "SPERSENE CF$^6$" + 75 lbs "NEWCEM$^7$"
Transition Fluid B: 0.95 bbl 12.2 lb/gal Mud$^5$ + 6 lbs "SPERSENE CF$^6$" + 37.5 lbs "NEWCEM$^7$"
Transition Fluid C: 0.89 bbl 10.5 lb/gal Mud$^8$ + 1 lb "SPERSENE CF$^6$" + 2 lbs NaOH + 7 lbs Na$_2$CO$_3$ + 100 lbs "NEWCEM$^7$"
Transition Fluid D: 0.78 bbl Seawater + 2 lbs "SPERSENE CF$^6$" + 220 lbs "NEWCEM$^7$"
$^1$94 lb sack of cement
$^2$trade name of Dowell Schlumberger for liquid antifoaming agent
$^3$trade name of Dowell Schlumberger for a liquid fluid loss additive.
$^4$trade name of Dowell Schlumberger for a liquid retarder.
$^5$Same as mud described in Example 1
$^6$Trade name of MI Drilling Fluids for chrome-free lignosulfonate
$^7$Trade name of Blue Circle Cement Co. for blast furnace slag having about 5500 Blaine specific surface area
$^8$Same as mud of Example 1 except lower density
$^9$Thickening time
$^{10}$Fluid loss additive Run 3 simulates the serious adverse effect of the mixing of the 16.4 lb/gal Portland cement and the 15.3 lb/gal lead slag-based cement which would occur without the transition fluid. Such unacceptable thickening could cause the cement job to fail. The mixture of the two slurries was too viscous to measure the fluid properties in the laboratory, therefore it may not be pumpable in the field. This compares with Run 14 which shows a transition fluid of this invention mixed with high density tail cement did not give unacceptably high viscosity, even at the most unfavorable ratio of those two ingredients. Runs 10 through 12 show that simple blast furnace slag transition fluids would also obviate the high viscosity problems but would not have the necessary activators to cause rapid setting so as to provide quick support for the pipe being cemented so there would be a longer wait on the cement setting. In wells where the temperature is elevated, setting of the transition fluid or even the lead slurry can be brought about just by the action of the heat. In any event, a smaller amount of activator, particularly the sodium hydroxide can be used at elevated temperatures. Similarly, Runs 6 through 9 show that even at densities as high as 13 lbs/gal a transition fluid obviates the high viscosity problem. Run 16 shows that the problem does not exist even at high loadings of blast furnace slag in the absence of the drilling fluid thus indicating that it is the interplay of the cellulosic additives in the drilling fluid with the Portland cement cementitious slurry that caused the problem.

Example 3

On another well, a 16-inch casing was set utilizing a 420 bbl blast furnace slag-based lead slurry mixed at 13.5 lb/gal followed by 850 sacks of Class H tail slurry mixed at 16.4 lb/gal. A 20 bbl batch of a 12.5 lb/gal blast furnace slag-based transition slurry was pumped between the lead and the tail slurries in order to minimize physical integration of the two fluids. "BI-OLOSE" (a modified starch from Milpark), as a fluid loss additive in the drilling fluid, had a gelling tendency upon mixing with Class H tail slurry. The low density (12.5 lb/gal) transition fluid effectively eliminated the high viscosities that would have developed from commingling the 13.5 lb/gal blast furnace slag-based lead and the 16.4 lb/gal Class H tail slurries.

Example 4

This Example shows that the transition fluids of this invention are cementitious slurries which would set up to give a strong support for a casing or liner.

TABLE II

| Test Start 11/25/92 | | Transition Fluid A | Transition Fluid B |
|---|---|---|---|
| 14.06 lbs/gal Mud | bbl | 0.28 | — |
| PHB$^1$ (30 lbs/bbl) | bbl | — | 0.11 |
| Sea Water | bbl | 0.50 | 0.78 |
| "SPERSENE$^2$" | lb/bbl | 2 | 1.8 |
| NaOH | lb/bbl | 2 | — |
| Na$_2$CO$_3$ | lb/bbl | 7 | — |
| "NEWCEM$^3$" | lb/bbl | 200 | 201 |
| Diluted Mud Weight | lb/gal | 10.5 | 8.56 |
| Slurry Weight | lb/gal | 13.3 | 11.65 |
| Fann 600 rpm reading at room temp. | | 38 | 21 |
| Fann 300 rpm reading at room temp. | | 18 | 11 |
| Fann 200 rpm reading at room temp. | | 12 | 8 |
| Fann 100 rpm reading at room temp. | | 6 | 5 |
| Fann 6 rpm reading at room temp. | | 1 | 2 |
| Fann 3 rpm reading at room temp. | | 1 | 2 |
| Plastic Viscosity, CP | | 20 | 10 |
| Yield Point, lb/100 ft$^2$ | | 0 | 1 |
| Gel Strengths, 10 sec/10 min lb/100 ft$^2$ | | 1/5 | 4/11 |
| UCA$^4$ Data @ 3000 psi | | 170° F.   225° F. | 170° F.   225° F. |

TABLE II-continued

| Test Start 11/25/92 | Transition Fluid A | | Transition Fluid B | |
| --- | --- | --- | --- | --- |
| Set Time to 50 psi; Hr:Min | 3:43 | 2:18 | 12:06 | 1:36 |
| Set Time to 500 psi; Hr:Min | 4:35 | 2:52 | 22:09 | 11:27 |
| Final Set Strength at 4.6 Days, psi | 1,391 | 1,135 | 765 | 759 |
| Brinell Compressive Strength, psi | 1,696 | 1,532 | 934 | 842 |
| Crush Compressive Strength, psi | 1,191 | 1,250 | 1,019 | 682 |

[1]Prehydrated Bentonite Clay
[2]Trade name of MI Drilling Fluids for chrome lignosulfonate
[3]Trade name of Blue Circle Cement Co. for blast furnace slag having about 5500 Blaine specific surface area
[4]Ultrasonic Cement Analyzer sold by Halliburton This Table shows both the transition fluids A and B set up quickly and give a very high strength. The transition fluid A was formulated using a drilling fluid with activators while the transition fluid B was formulated with a prehydrated bentonite slurry without activators. While the simple transition fluid B is operable, it set up much more slowly and gave lower ultimate strength.

While this invention has been described in detail for the purpose of illustration, it is not to be construed as limited thereby but is intended to cover all changes and modifications within the spirit and scope thereof.

What is claimed is:

1. A wellbore cementing process comprising:
   introducing a lead cementitious slurry comprising blast furnace slag and a drilling fluid into a wellbore;
   thereafter introducing a transition fluid comprising blast furnace slag, said transition fluid being of lower density than said lead slurry; and
   thereafter introducing a tail slurry comprising Portland cement.

2. A method according to claim 1 wherein said lead cementitious slurry has a density within the range of about 13.5 to 19 lbs/gal, said transition fluid has a density within the range of about 8.5 to less than 13.5 and wherein said lead slurry and said transition fluid each comprise in addition an activator system.

3. A method according to claim 2 wherein said Portland cement has a density within the range of 14.5 to 18 lbs/gal.

4. A method according to claim 3 wherein said blast furnace slag of said lead cementitious slurry and of said transition fluid has a particle size such that it exhibits a surface area within the range of 4,000 to 9,000 cm$^2$/g.

5. A method according to claim 4 wherein said activator system of said lead cementitious slurry and o said transition fluid comprises 1 to 12 lbs/bbl of caustic soda in conjunction with 2 to 20 lbs/bbl of soda ash.

6. The method according to claim 5 wherein said lead cementitious slurry and said transition fluid are each prepared by introducing blast furnace slag into a flowing stream of a used drilling fluid.

7. A method according to claim wherein said drilling fluid is an aqueous drilling fluid.

8. A method according to claim 6 wherein said drilling fluid contains a salt.

9. A method according to claim 1 wherein said drilling fluid contains 1 to 100 lbs/bbl of blast furnace slag and further contains a retarder.

10. A method according to claim 1 wherein said blast furnace slag of said lead cementitious slurry and of said transition fluid has a particle size such that it exhibits a surface are within the range of 4,000 to 9,000 cm$^2$/g.

11. A method according to claim 2 wherein said activator system of said lead cementitious slurry and of said transition fluid comprises 2 to 6 lbs/bbl of caustic soda in conjunction with 2 to 20 lbs/bbl of soda ash.

12. A method according to claim 1 wherein said lead cementitious slurry and said transition cementitious slurry are each made by introducing said blast furnace slag into a flowing stream of used drilling fluid.

13. A method according to claim 2 wherein said activator system of said lead cementitious slurry and said transition fluid each comprises at least one of lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, titanium carbonate, potassium carbonate, sodium hydroxide, potassium hydroxide, potassium sulfate, potassium nitrite, potassium nitrate, calcium hydroxide, sodium sulfate, copper sulfate, calcium oxide, calcium sulfate or gypsum, calcium nitrate, or calcium nitrite.

14. A method according to claim 1 wherein said lead cementitious slurry comprises in addition an activator system and is introduced into a pipe in direct fluid contact with a drilling fluid, wherein said transition fluid is introduced into said pipe in direct fluid contact with said lead cementitious slurry, wherein said Portland cement is introduced into said pipe in direct fluid contact with said transition fluid and wherein a displacement fluid is introduced into said pipe in direct fluid contact with said Portland cement cementitious slurry.

15. A method according to claim 14 wherein said drilling fluid is displaced from an annulus surrounding said pipe, said lead cementitious slurry is displaced to a location adjacent a top portion of said pipe and said tail cementitious slurr is displaced into said annulus adjacent the bottom of said pipe.

16. A method according to claim 15 wherein said drilling fluid is an oil-based drilling fluid and said lead cementitious slurry containing a surfactant.

17. A method according to claim 15 wherein said displacement fluid is drilling fluid.

18. A method of drilling and cementing comprising:
   drilling a borehole with a drill string utilizing a drilling fluid having a density of about 12 lbs/gal, said drilling fluid comprising water, sodium chloride, bentonite, carboxymethyl starch, partially hydrolyzed polyacrylamide and CMC thus producing a used drilling fluid further comprising drill solids;
   removing said drill string and disposing a pipe within said borehole, a portion of said used drilling fluid being disposed in said pipe and in an annulus surrounding said pipe;
   passing a flowing stream of a portion of said used drilling fluid to a mixing zone and introducing sufficient blast furnace slag to give a lead cementitious slurry having a density of about 15.3 lbs/gal;

introducing said lead cementitious slurry into said pipe;

passing another portion of said used drilling fluid as a flowing stream to a mixing zone and introducing blast furnace slag to said flowing stream to produce a transition fluid having a density of about 13 lb/gal;

introducing said transition fluid into said pipe in direct fluid contact with said lead cementitious slurry, said lead cementitious slurry and said transition fluid each having incorporated therein an activator system comprising 2 to 6 lbs/bbl of caustic soda and 2 to 20 lbs/bbl of soda ash;

thereafter introducing a Portland cement tail cementitious slurry into said pipe in direct fluid contact with said transition fluid, said tail cementitious slurry having a density of about 16.4 lbs/gal; and displacing said lead cementitious slurry to a position in an annulus surrounding said pipe adjacent an upper portion of said pipe and displacing said tail cementitious slurry into said annulus adjacent a lower portion of said pipe with a displacement fluid selected from seawater and drilling fluid.

19. A method according to claim 18 wherein said flowing stream of said used drilling fluid is diluted with water before said blast furnace slag is introduced to produce said lead cementitious slurry.

20. A method according to claim 19 wherein said flowing stream is diluted with seawater.

* * * * *